United States Patent
Chen et al.

(10) Patent No.: US 7,426,526 B2
(45) Date of Patent: Sep. 16, 2008

(54) METHOD AND SYSTEM FOR THE CREATION AND REUSE OF CONCISE BUSINESS SCHEMAS USING A CANONICAL LIBRARY

(75) Inventors: David D. Chen, Cary, NC (US); Ralph A. Hertlein, Alpharetta, GA (US); John W. Miller, Suwanee, GA (US); William R. Wise, Jr., Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/214,337

(22) Filed: Aug. 29, 2005

(65) Prior Publication Data

US 2007/0050407 A1 Mar. 1, 2007

(51) Int. Cl.
*G06F 17/00* (2006.01)
(52) U.S. Cl. ............ 707/104.1; 707/1; 707/3; 707/6; 707/102; 715/760
(58) Field of Classification Search ............ 707/1–10, 707/100–104.1, 200–206; 715/234, 239, 715/700, 744, 760, 762
See application file for complete search history.

(56) References Cited

U.S. PATENT DOCUMENTS

| 6,546,381 | B1 * | 4/2003 | Subramanian et al. ......... 707/2 |
| 6,604,099 | B1 * | 8/2003 | Chung et al. .................. 707/3 |
| 6,718,320 | B1 * | 4/2004 | Subramanian et al. ......... 707/2 |
| 6,782,379 | B2 * | 8/2004 | Lee ................................. 707/2 |
| 7,287,037 | B2 * | 10/2007 | An et al. ...................... 707/102 |

OTHER PUBLICATIONS

Roy et al., XML schema language taking XML to the next level, Apr. 2001, IEEE, 37-40.*
Vassil et al., Integrating XML and Object-based Programming for Distributed Collaboration, Jun. 14-16, 2000, IEEE, 254-259.*
Hong Su et al., Automating the Transformation of XML Documents, Nov. 2001, ACM, 68-75.*

* cited by examiner

*Primary Examiner*—Jean B Fleurantin
(74) *Attorney, Agent, or Firm*—Cahn & Samuels, LLP; Derek S. Jennings

(57) ABSTRACT

An exemplary feature is a method for using XML Schema based standards. The method consists of constructing a reduced schema for a specific interaction from a collection of reusable artifacts. The method further consists of publishing the reduced schema in a repository thereby allowing the reduced schema to be reused.

1 Claim, 5 Drawing Sheets

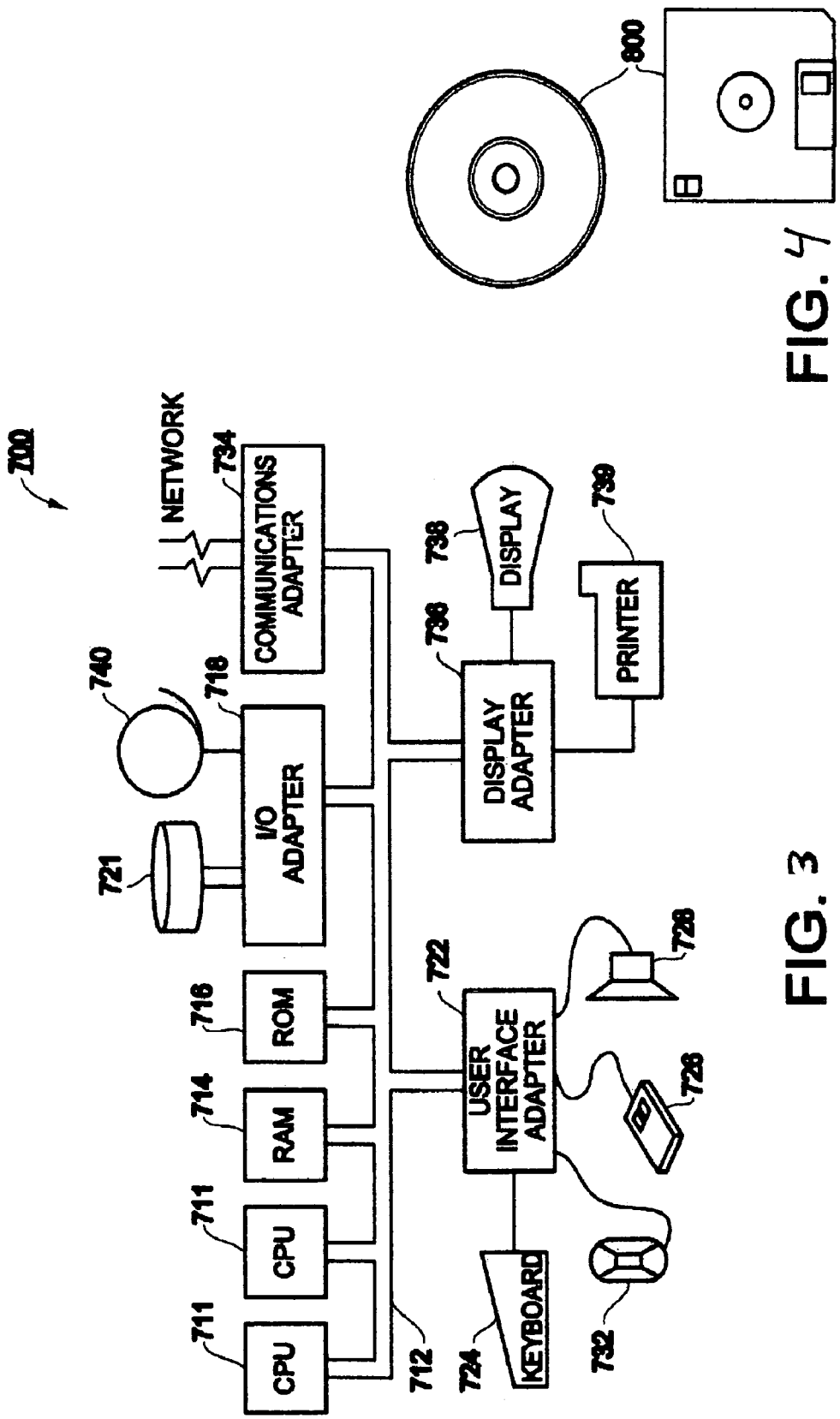

METHOD AND SYSTEM FOR THE CREATION AND REUSE OF CONCISE BUSINESS SCHEMAS USING A CANONICAL LIBRARY

FIELD OF THE INVENTION

The present invention relates to the fact that creation and use of XML Schema based canonical or vertical business standards require an in-depth understanding of the standards, of XML, of Schema and the business to develop efficient business interactions and processes.

BACKGROUND

U.S. Pat. No. 5,970,490 discloses a method for processing heterogeneous data including high level specifications to drive program generation of information mediators, inclusion of structured file formats (also referred to as data interface languages) in a uniform manner with heterogeneous database schema, development of a uniform data description language across a wide range of data schemas and structured formats, and use of annotations to separate out from such specifications the heterogeneity and differences that heretofore have led to costly special purpose interfaces with emphasis on self-description of information mediators and other software modules.

U.S. Pat. No. 6,604,099 discloses a schema discovery system and associated method to discover a majority schema for a set of related and similarly marked up documents, such as HTML documents, based on the assumption that though the structure of these documents is mostly for visual purposes, the keywords used in the documents along with the structural tags provide some hints, and allow a rough sketch of the underlying intended schema. With the assumption that albeit the set of HTML documents are marked up differently due to diverse authoring skills, they are closely related in content, it is reasonable to find a schema that can unify these different schemas, which schema is shared by the majority of these HTML documents. The system employs constraint rules on tree ordering to reduce the computational complexity in arriving at optimized XML DTD schema. These generalized XML DTD schemas may be used to perform automated comparison and evaluation schemes of profile documents on the WWW.

U.S. Pat. No. 6,782,379 discloses an Identity System that delivers customized request responses that integrate the results of multiple programs. The Identity System receives and translates a user request. The Identity Systems employs a program service to identify all the programs required to complete the request. The Identity System uses an XML data registry to retrieve an XML template and XSL stylesheet for each program. The Identity System executes all of the programs for the request and organizes their results into a single data structure, based on the templates for each program. The Identity System then applies attribute display characteristics to convert the data structure into a single Output XML. The Output XML can be provided directly to the user or receive further processing using the retrieved XSL stylesheets.

A publication by Brahim Medjahed et al., as published in the VLDB Journal (2003) 12: 59-85 discloses that Business-to-Business (B2B) technologies pre-date the Web. They have existed for at least as long as the Internet. B2B applications were among the first to take advantage of advances in computer networking. The Electronic Data Interchange (EDI) business standard is an illustration of such an early adoption of the advances in computer networking. The ubiquity and the affordability of the Web have made it possible for the masses of businesses to automate their B2B interactions. This paper, surveys the main techniques, systems, products, and standards for B2B interactions.

A publication by M. Arenas et al, as published in Computer Science Vol. 2453, pp. 269-278, 2002 discloses that data description for XML usually comes in the form of a type specification (e.g., a DTD) together with integrity constraints. XML Schema allows one to mix DTD features with semantic information, such as keys and foreign keys. It was shown recently that the interaction of DTDs with constraints may be rather nontrivial. In particular, testing if a general specification is consistent is undecidable, but for the most common case of single-attribute constraints it is NP-complete, and linear time if no foreign keys are present.

SUMMARY OF THE INVENTION

An exemplary feature of this invention is a method for using XML Schema based standards. The method consists of constructing a reduced schema for a specific interaction from a collection of reusable artifacts. The method further consists of publishing the reduced schema in a repository thereby allowing the reduced schema to be reused.

Another exemplary feature of this invention is a method that publishes the reduced schema to promote reuse from existing specific business schema repositories.

A further exemplary feature of this invention is a method of using the constructed reduced schema and validating it against a Canonical Schema.

Still another exemplary feature of this invention is a method that uses constructed reduced schema to reduce data volume and processing business functionality.

A further exemplary feature of this invention is a method that uses the constructed reduced schema and an artifacts library that facilitates reuse of XML Schema fragments.

Yet another exemplary feature of this invention is a method that uses an artifacts library that facilitates reuse of common building blocks.

Still another exemplary feature of this invention is a method that uses the constructed reduced schema to maximize the consistency of structure and field definition of all precise business interactions throughout an entire XML messaging process.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

FIGS. 3 and 4 illustrate an exemplary hardware/information handling system for incorporating the present invention.

DETAILED DESCRIPTION

Figure 1:
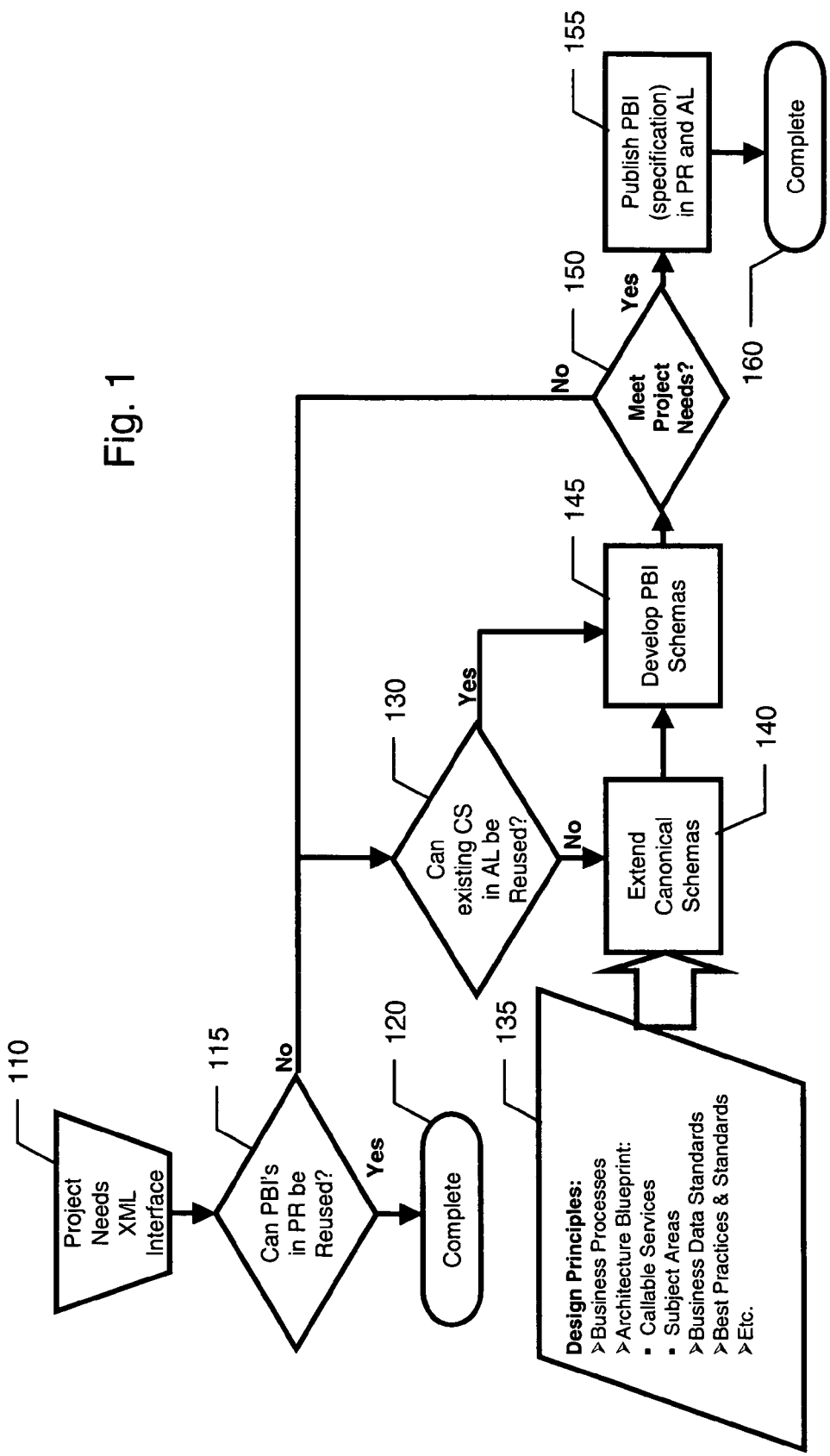
FIG. 1 illustrates a flow for an XML Schema according to an embodiment of the present invention.

Current methods hinder business interaction specific schemas without all parties having full understanding of all factors involved—thus slowing the development of successful interaction schemas quickly and requiring extensive XML processing. Business participants in such a process are forced to interact with canonical standard schemas that can contain hundreds if not thousands of elements and attributes without a simple, repeatable, scalable way of selecting and using a specific subset of those standards for business interactions. Without a scalable, repeatable way to generate subsets of larger Canonical Schemas, each business interaction designer will be forced into either designing unique schemas, into manual methods of selecting appropriate/desired sections, elements and attributes from a Canonical Schema, or into developing large amounts of post processing—requiring a complete knowledge of both the technology and the business processes, thus limiting the use of business standards in the general market place. Current solutions point to either a standard schema that is developed in such a way that it is highly focused to a specific market sub-segment, or developed such that it can be more canonical and unconstrained—forcing the unique business constraints to be applied outside the standard. In the later case, each user will need to process the larger Canonical Schema in its entirety using downstream applications from the typical XML parsing and validation process steps to select desired subsets of the larger schema or they are required to manually create variations of the canonical standard through manual editing methods that are not repeatable or scalable.

An embodiment of the present invention includes a method of creating and using and reusing a filtration mechanism to allow the selection, alteration and elimination of subsets of types, elements and attributes from a larger schema, combined with a method to add restrictions and optionality to desired selections for the purpose of creating a more precise and focused schema from the larger, Canonical Schema for a specific or set of specific business interactions that could then be saved and reused. The method would also include the capability to generate documentation in multiple formats (print, html, etc.) from the selected subset and would also permit the filtration mechanism to be saved and re-applied for the development of other schemas—enhancing the reuse of the filtration mechanism. This method of filter creation would permit the rapid reuse of the selected subsets such that small variations could be accommodated quickly—speeding the creation of business interaction specific schemas while simultaneously leveraging the development and use of larger canonical business semantic standards. Such methods would also speed the creation of business-to-business interactions in that business interaction specific schemas will reduce the extensive negotiations that are currently needed to set up and initiate business-to-business interactions that are tailored to specific relationships without loosing the value of the canonical semantic standards developments.

A method accordingly to another embodiment of the present invention would apply a level of metadata on top of existing schemas that could then be used to override the schema, add additional documentation and eventually be used to drive a processing engine that would output a new schema or set of schemas that would essentially replicate the structure and contents of the base schema with the filtrations added. An example would be:

Starting from an existing schema that includes multiple imports, includes and namespaces as a base;

Add additional metadata, documentation and controls that permit; type, element and attribute exclusions, type, element and attribute alterations, cardinality alterations and documentation alterations such that these changes can be saved for later exchange use and reuse;

Use the additional filtration information as input into an engine that would then process the changes to generate additional stand alone schema(s) that fulfill the filtration parameters within the framework of the original schema;

Save the filtration information for further refinement, reuse and use with additional schemas;

Provide indication of any inconsistencies between the filter and the schema if any exist; and Permit the exporting of the filtration data in XML format.

The filtration engine would use the combination of W3C XML Schema specifications and local configurable rules to assemble the base schema being filtered, apply filtration information and then create output schemas and documentation according to the constructs contained in the filter.

FIG. 1 illustrates a first embodiment according to the present invention. Project Needs XML Interface 110 identifies the needs of developing XML Schemas to describe the interfaces of a component in any XML based interaction development project including Services Oriented Architecture projects. The requirement of the interface is described, and input to the decision step 115 that queries the question, "Can Precise Business Interfaces (PBI's) in the PBI Repository (PR) be reused? The PR, which contains XML Schema definitions of various interfaces which precisely describe the business interactions is searched. If a match between a PBI in the PR and the interface requirement has been found, the task of obtaining XML Schemas for the interface is complete 120, and the development project can start code development.

If the matching PBI cannot be found in the PR 115, then a new PBI must be developed. The new PBI's are constructed by Subject Matter Experts based on the methodology and reusable artifacts in the Artifacts Library (AL). The requirement is input to search existing Canonical Schemas in the AL 130. AL Canonical Schemas artifacts consist of atomic data definitions, primitive and complex business object definitions, and business message definitions. If an existing Canonical Schema (CS) has all the fields need to meet the requirement, then input the schema definition selected into the Develop PBI Schema 145. If none of the existing business message definitions can completely fulfill the requirement, the requirement is input to the Extend Canonical Schemas step 140. High level business use cases, scenarios, related standards and best practices are consulted when extending the Canonical Schemas 135.

If the existing schemas and pieces of schema definitions (or building blocks) cannot completely fulfill the requirement, New Canonical Schemas will be constructed and assembled from the existing building blocks, the atomic data definitions, primitive and complex business object definitions. Pieces of schema definitions are extended to add more fields to the related structures, and relaxed, e.g., allow more occurrences. The results after extension of the Canonical Schemas are stored back in the Artifacts Library for this and all future PBI schema development 145. Once the canonical business message definition that completely satisfies the requirement is identified, the Canonical Schema for the message is input to Development PBI Schema 145. The process of extending Canonical Schemas only adds additional fields or removes constraints of the existing schemas. That is, new Canonical Schemas are always backward compatible to older Canonical Schemas.

New PBI's are developed from Canonical Schemas by using existing filtration schemas and then selecting fields or restricting the characteristics of the Canonical Schemas. This process ensures that any XML documents that are validated by PBI also validated by Canonical Schema (CS). This methodology insures the structure and vocabularies of CS and all PBI's are always consistent and can be quickly assembled. Once a version of PBI is completed, the PBI is reviewed with the project team to determine if all requirements have been met 150. If some of the requirements are not met, the gaps are fed back to Subject Matter Experts to even further extend the CS and modify the PBI as needed. If all requirements are satisfied, the newly constructed PBI schemas are published to PR 155 for all future projects to use. Project team can use the PBI completed to start code development 160.

Figure 2:
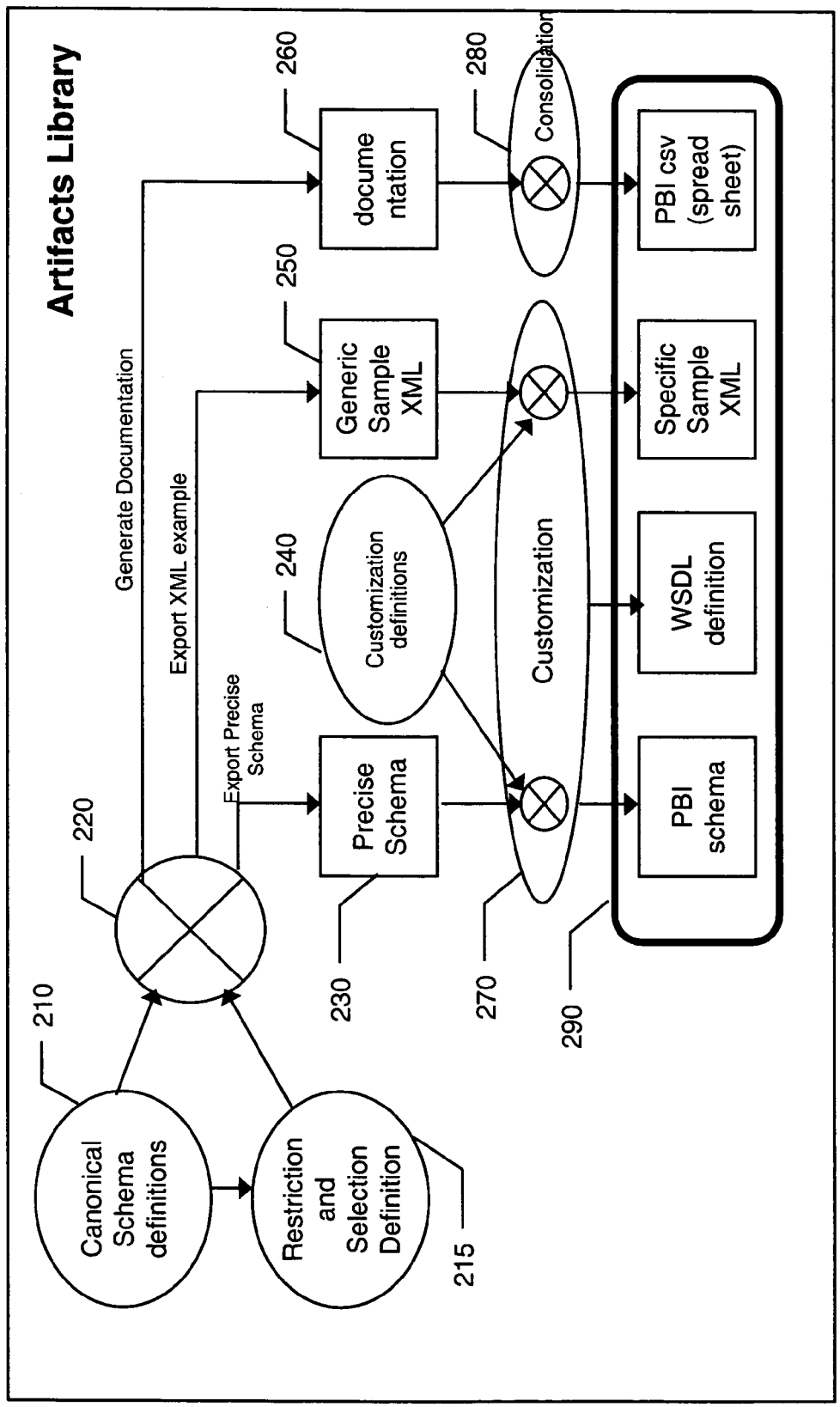
FIG. 2 illustrates various schemas as used within an artifacts library according to an embodiment of the present invention.

FIG. 2 illustrates another embodiment according to the present invention. Canonical Schemas with fully relaxed (e.g., all fields are optional, and unbounded in occurrences) are constructed to provide common business vocabularies and structure 210. For any interface definition such as a Service Oriented Architecture component, specific business definition is constructed from the CS in the Artifact Library by selecting needed fields, and restricting their allowed values and occurrences 215. Documentation of the mapping to database terms are inserted into these filtration artifacts. Canonical Schemas and the filtration artifacts containing the restriction and selection definitions are input to the process to generate various artifacts to meet all development needed 220. Generic precise schemas are created from the Canonical Schemas and from the filtration artifacts containing the restriction and selection definition 230. Generic sample XML documents are also generated 250. Documentation of attributes of selected fields and mapping instruction is created 260.

Often these generic precise schemas and sample XML documents do not meet the project specific needs and the limitations of the tooling. Project specified customization is defined using XML 240, and provide input into the creation of the project specific artifacts 270 and creation of sample XML messages 270. Artifacts created include, but are not limited to, Web Services Description Language (WSDL) files that describe the interface, PBI XML Schemas which describe the payload of the messages, sample XML documents which simplifies the mapping exercise and later testing and the consolidation of the documentation into spreadsheet 280 that identifies all fields with XPath and their characteristics and mapping information in a simple condensed spreadsheet format 290.

All these artifacts are stored in the Artifacts Library (AL) 295 for later reuse. They include the Canonical Schemas, restriction and selection definitions, and customization information.

Exemplary Hardware/Software Implementation

FIG. 3 illustrates a typical hardware configuration of an information handling/computer system 700 usable with the present invention, as described later, and which computer system preferably has at least one processor or central processing unit (CPU) 711. In the exemplary architecture of FIG. 3, the CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739 (e.g., a digital printer or the like).

In addition to the hardware/software environment described above, a different aspect of the invention includes a computer-implemented method for performing the invention.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the invention.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 4), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless.

Software Deployment

Figure 5:
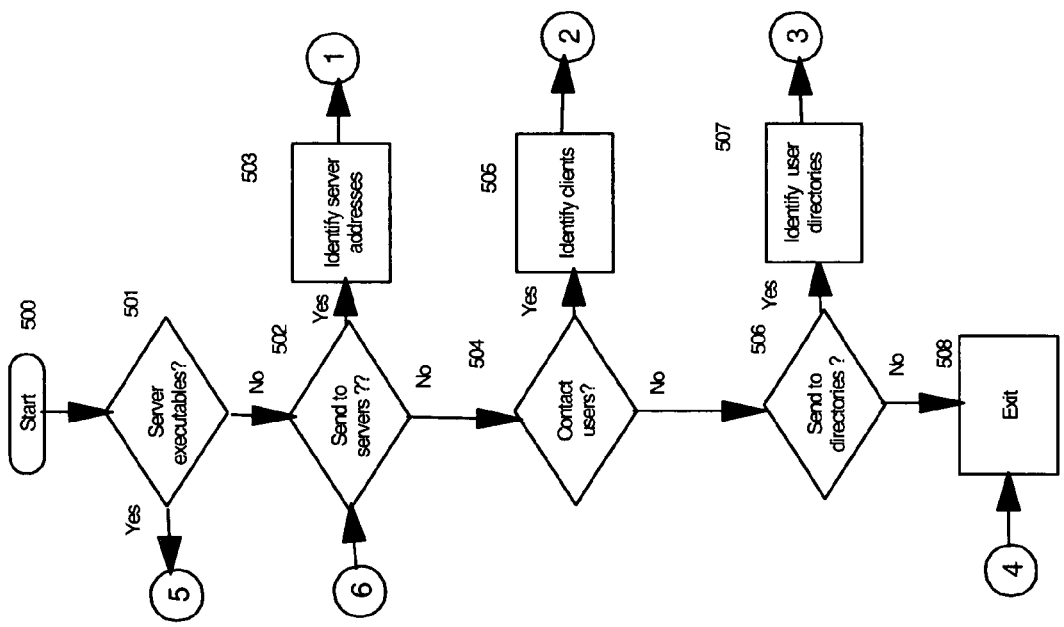
FIGS. 5 and 6 illustrate an exemplary deployment system and method for incorporating the present invention.
Figure 6:
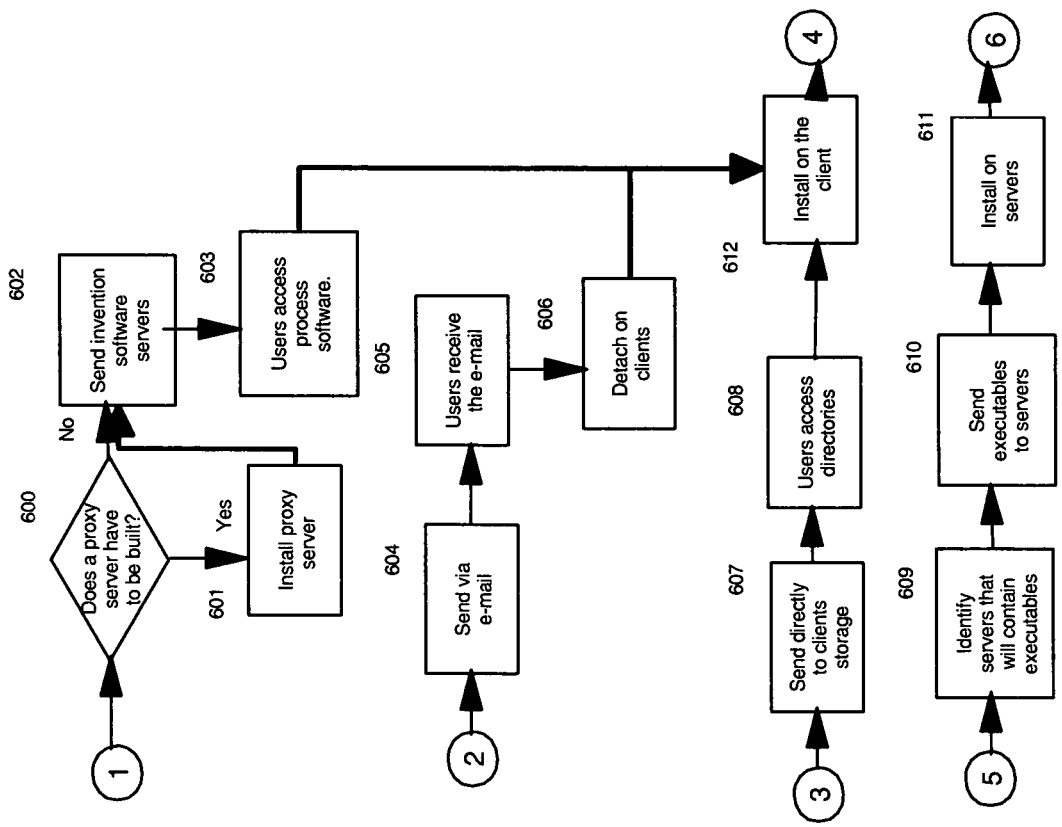

The present embodiments are deployable as processed software. According an embodiment of the present invention deploys the reuseable schemas as a service. FIGS. 5 and 6 illustrate the deployment method. Step 500 begins the deployment of the process software. The first thing is to determine if there are any programs that will reside on a server or servers when the process software is executed 501. If this is the case then the servers that will contain the executables are identified 609. The process software for the server or servers is transferred directly to the servers' storage via FTP or some other protocol or by copying though the use of a shared file system 610. The process software is then installed on the servers 611.

Next, a determination is made on whether the process software is be deployed by having users access the process software on a server or servers 502. If the users are to access the process software on servers then the server addresses that will store the process software are identified 503.

A determination is made if a proxy server is to be built 600 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 601. The process software is sent to the servers either via a protocol such as FTP or it is copied directly from the source files to the server files via file sharing 602. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 603. Another embodiment is to have the servers automatically copy the process software to each client and then run the installation program for the process software at each client computer. The user executes the program that installs the process software on his client computer 612 then exits the process 508.

In step 504 a determination is made whether the process software is to be deployed by sending the process software to users via e-mail. The set of users where the process software will be deployed are identified together with the addresses of the user client computers 505. The process software is sent via e-mail to each of the users' client computers. The users then receive the e-mail 605 and then detach the process software from the e-mail to a directory on their client computers 606. The user executes the program that installs the process software on his client computer 612 then exits the process 508.

Lastly a determination is made on whether to the process software will be sent directly to user directories on their client computers 506. If so, the user directories are identified 507. The process software is transferred directly to the user's client computer directory 607. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 608. The user executes the program that installs the process software on his client computer 612 then exits the process 508.

Various other embodiments of the present invention include:

A methodology that constructs reduced schema for a specific business interaction from a collection of reusable artifacts through a stepwise approach;

A methodology that promotes reuse from existing specific business schema repository;

A methodology that constructs reduced schemas that can still be validated against a Canonical Schema;

A methodology that constructs more efficient schemas that reduce data volume and processing while maintaining full business functionality;

A methodology that constructs restricted schemas that can still be validated against a Canonical Schema; and A methodology based on an artifacts library that facilitates reuse of XML Schema Fragments or common building blocks.

A methodology that reduces post validation processing of schemas

A methodology that reduces database mapping efforts through repeatable reuse of message structure and semantics Still another embodiment of the present invention includes:

A stepwise methodology that maximizes the consistency of the structure and field definition of all precise business interactions, and improves reuse potentials throughout the entire XML messaging process;

The first step of the methodology consists of constructing a canonical business interaction schema base consisting of reusable XML Schema Fragments or building blocks with fully relaxed fields, each focused on their own specific subject areas;

The second step is to then assemble the schema fragments into larger Canonical Schemas that are targeted to specific business interactions and process steps and enter them in a library;

The third step is to copy one of the larger Canonical Schemas as the basis for a reduced schema;

The fourth step of the process is to remove undesired fields from copies of the Canonical Schemas to create the first level reduced schemas; and The fifth step is to then restrict desired fields to further reduce the schema for use.

Terminology:

Canonical Schema (CS): A set of fully relaxed field definitions and building blocks that contain fields needed for all transactions for all business subject areas. The Canonical Schemas are used to develop transaction specific messages (using subsets from the canonical model). This facilitates the creation of consistent, re-usable messages, and provides consistent business vocabularies and structures (data model) for messages. Canonical Schema models are evolved by adding new fields and removing any constraints.

Restriction and Selection Definition (RSD): A definition that specifies fields that are used in a specific business interaction, and including its characteristics that act as a reusable filtration mechanism. RSD is based on the Canonical Schemas. And RSD never expands the CS vocabulary or structure. Often the information regarding the mapping of the fields to a specific implementation is also documented in the definition.

Precise Schema (PS): A schema that is tailored to the specific needs of a business interaction without changing the namespaces or remove tool unfriendly constructs. It is generated from the Canonical Schemas and its Restriction and Selection Definition.

Precise Business Interaction (PBI) Schema: A schema from Precise Schema with the namespace defined specifically for the project team, and unfriendly schema construct removed. A precise business interaction (PBI) schema "precisely" defines the messages of a specific business interaction. It is derived from Canonical Schemas by selecting and restricting field definitions in the canonical model. PBI Schemas must be a subset of the Canonical Schema. That is, all XML messages of a PBI Schema must also be validated with its associated "parent" Canonical Schema. This schema can be used directly by applications to develop transaction specific messages.

PBI Repository (PR): A repository that production PBI's are stored. It facilitates the search and reuse at the PBI level.

Artifacts Library (AL): A version controlled library that CS, PBI Schemas, and Restriction and Selection Definitions are stored. It facilitates the construction of new CS and PBI Schemas, and promotes reuse and consistency in the schema structure and vocabularies.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

What is claimed is:

1. A method for using XML schema based standards, comprising:
    evaluating a project's need for at least one XML interface;
    searching a Precise Business Interface Repository for at least one Precise Business Interface containing XML Schema definitions of various interfaces for a specific interaction;
    determining whether said existing Precise Business Interfaces in said Precise Business Interface Repository can be reused for said XML project by determining if a match between a Precise Business Interface in the Precise Business Interface Repository and the interface requirement exist;

if a match exist, obtaining the matching XML Schema from said Precise Business Interface Repository and implementing said matching XML Schema;

if a match does not exist, constructing a new XML Schema for the interface by searching existing Canonical Schemas contained in the Artifacts Library for the requirement, wherein said Artifacts Library Canonical Schemas artifacts comprise atomic data definitions, primitive and complex business object definitions, and business message definitions;

determining if an existing Canonical Schema contained in said Artifacts Library has all of the fields needed to meet the interface requirement;

if an existing Canonical Schema is determined to have all the fields needed to meet the interface requirement; retrieving said Canonical Schema definition and developing said Precise Business Interfaces Schema therefrom;

if the existing schemas, pieces of schema definitions, and schema building blocks cannot completely fulfill the interface requirement, developing and assembling a New Canonical Schema from the existing building blocks, the atomic data definitions, primitive and complex business object definitions, via extending and relaxing pieces of schema definitions by adding fields to the related structures;

developing at least one new Precise Business Interface from said New Canonical Schema by using existing filtration schemas and selecting fields or restricting the characteristics of the Canonical Schema;

storing the results of the extension of said New Canonical Schema in the Artifacts Library;

reviewing said Precise Business Interfaces to determine if all the requirements have been met;

if some of the requirements are not met, extending said Canonical Schema and modifying said Precise Business Interfaces to address the gaps;

publishing said newly constructed Precise Business Interfaces schema to Precise Business Interface Repository for all future use.

* * * * *